April 3, 1945. J. TURPAN 2,373,068
RODENT TRAP
Filed Dec. 8, 1943

INVENTOR,
James Turpan,
BY John W. Steward
ATTORNEY.

Patented Apr. 3, 1945

2,373,068

UNITED STATES PATENT OFFICE 2,373,068

RODENT TRAP

James Turpan, Paterson, N. J.

Application December 8, 1943, Serial No. 513,409

4 Claims. (Cl. 43—81)

This invention relates to rodent traps and particularly to that class in which, on a base, is pivoted a clamp movable in an overreaching arc and spring-urged in one direction to coact with the base to clamp and movable in the opposite direction to a position in which it faces the base, and there is a lever pivoted to the base and adapted to overreach the clamp when the latter is in said position, to hold it there, and, in addition, there is some bait-controlled device which confines the said lever in the state in which it holds the clamp in said position, to wit, so long as the bait, as by being disturbed, does not release said device.

According to my invention, assuming the trap structure to include the base, clamp and lever and that said base provides a bearing, said device is what I term a detent-lever which extends under and is fulcrumed between its ends on the bearing and, when the clamp is in the aforesaid position and is over-reached by the lever, is adapted to have one end thereof overlie the lever and its other end to be chocked by bait supported by the base. But, instead of such a detent-lever being fulcrumed to turn around a fixed axis afforded by said bearing, the detent-lever is slidable, in contact with the bearing, in the direction from the lever to free the latter. Preferably said detent-lever has a stop arranged to engage the bearing to limit its sliding in the opposite direction as in setting the trap. In the form herein shown the detent-lever has a fulcrum seat existing as a substantially straight upwardly facing guideway extending lengthwise of such lever and adapted to engage the bearing and the said stop is arranged at one side of such seat and a depression is formed in the detent-lever at the other side of the seat.

Figure 1:
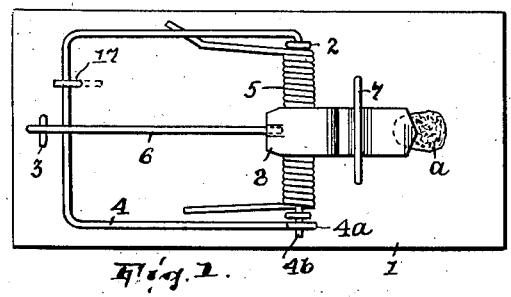
Fig. 1 is a plan of the trap in set state.
Figure 2:
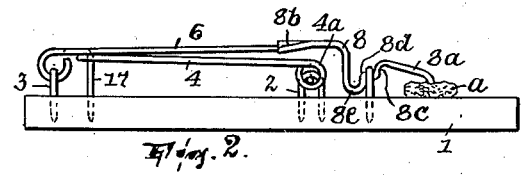
Fig. 2 is a side elevation and Fig. 3 an end elevation thereof.
Figure 3:
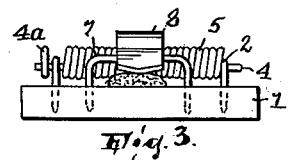
Figures 4, 5:
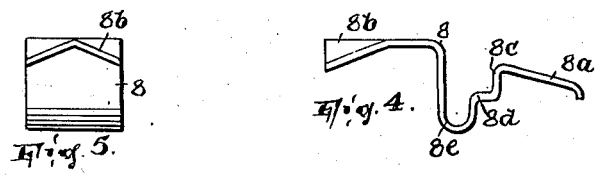
Figs. 4 and 5 show the detent-lever in side and left-hand end elevation.

In Figs. 1, 2 and 3 1 is the base having a pair of staples 2 and a staple 3; 4 is the clamp, formed U-shaped and of wire, as usual, which has one end formed with an eye 4a and its other end portion 4b forming the pivot for the clamp and penetrating said eye and the staples 2; 5 is the usual spring coiled about end portion 4b and having one end bearing against the base and the other so engaged with the clamp that the spring normally urges the latter into clamping and hence facing relation to the base at the right side of said pivot; and 6 is the usual lever pivoted to staple 3 and adapted to overreach the clamp to hold it in the (set) position shown.

The base so far described includes a bearing 7, here in the form of a staple driven into the base at the right side of pivot 4b and the spring and on which is fulcrumed the mentioned detent-lever 8.

In this example such detent-lever is formed of a stiff strip of sheet metal having one end 8a bent downwardly and more or less pointed and the other end 8b bent transversely to provide an underneath crotch to receive the free end of lever 6. Between its ends the strip is bent downwardly at 8c to provide a stop and then toward the end 8b to provide a more or less narrow fulcrum seat at 8d existing as a substantially straight upwardly facing guideway extending lengthwise of the detent-lever and, next adjoining the seat at the left side thereof, it is formed with a downward rebend 8e providing a depression.

The trap is set in the state shown best by Fig. 1, that is to say: the clamp being shifted against the tension of the spring to the position shown and the lever made to over-reach the clamp, the detent-lever is engaged at its guideway 8d with the bearing 7 and its left-hand end made to overlie the free end of the lever, whereupon its right-hand end is chocked by bait a, as of breadcrust supported by the base. Movement of the detent-lever to the right, as by disturbing the bait, will cause it to release the lever, thus to spring the trap. For this purpose the mentioned guideway 8d, which at one side is flanked by the stop 8c (which limits movement of the detent-lever to the left) and at the other side by depression 8e, is preferably but little longer than the bearing is thick. This, and the fact also that the bearing is of greater lengthwise extent than the width of the detent-lever, so that the latter may undergo angular displacement horizontally, make the detent readily responsive to movement which will release the lever.

Figure 6:
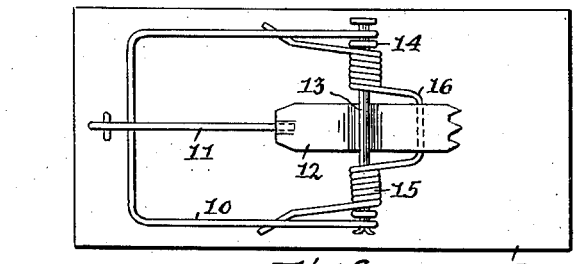
Fig. 6 is a view like Fig. 1 of a modified form of the trap.

In Fig. 6 the base 9, clamp 10 and lever 11, together with the detent-lever 12, are the same as the corresponding parts already described, but the bearing for the detent-lever is provided as follows: The clamp is pivoted on a pin 13 supported in staples 14 and the clamp spring is formed by two coils 15 joined by a rebend 16, which bears against the base, the ends of the springs engaging the clamp. The said bearing is afforded by the portion of the pin between the coils.

At 17 is shown an L-shaped detent device driven into the base near the clamp in the position which the latter occupies when the trap is set, said device being turned into or out of position to overhang the clamp thus to hold the latter in its said position when the setting is being accomplished. It is shown so holding the clamp in Figs. 1 and 2.

Given a rodent trap including, with a base, as 1, and a lever, as 6, pivoted thereto and movable upwardly from and downwardly toward and normally (by which I mean when the trap is in set state) urged upwardly (as by 5—4) from the prone relation to the upper surface of the base such as is shown by Fig. 2, said base having a bearing above and spaced from said surface, my invention contemplates combining therewith the detent-lever herein described and shown and as set forth in the annexed claims.

Having thus fully described my invention, what I claim is:

1. A rodent trap including, with a base and a lever pivoted thereto and movable upwardly from and downwardly toward and normally urged upwardly from prone relation to the upper surface of the base, said base having above and spaced from said surface a bearing, a detent-lever extending under the bearing and movable lengthwise of itself to and from a position in which one end thereof will overlie the lever when the latter is in prone relation to said surface, said detent-lever having under the bearing a substantially straight upwardly facing guideway extending lengthwise thereof and arranged to engage the bearing when said detent-lever is in said position and its other end is supported by bait resting on said surface.

2. A rodent trap including, with a base and a lever pivoted thereto and movable upwardly from and downwardly toward and normally urged upwardly from prone relation to the upper surface of the base, said base having above and spaced from said surface a bearing, a detent-lever extending under the bearing and movable lengthwise of itself to and from a position in which one end thereof will overlie the lever when the latter is in prone relation to said surface, said detent-lever having under the bearing a substantially straight upwardly facing guideway extending lengthwise thereof and arranged to engage the bearing when said detent-lever is in said position and its other end is supported by bait resting on said surface and said detent-lever also having a stop adjoining the end of the guideway remote from and facing the lever.

3. A rodent trap including, with a base and a lever pivoted thereto and movable upwardly from and downwardly toward and normally urged upwardly from prone relation to the upper surface of the base, said base having above and spaced from said surface a bearing, a detent-lever extending under the bearing and movable lengthwise of itself to and from a position in which one end thereof will overlie the lever when the latter is in prone relation to said surface, said detent-lever having under the bearing a substantially straight upwardly facing guideway extending lengthwise thereof and arranged to engage the bearing when said detent-lever is in said position and its other end is supported by bait resting on said surface and said detent-lever also having a depression at the end of the guideway adjoining the lever.

4. A rodent trap including, with a base and a lever pivoted thereto and movable upwardly from and downwardly toward and normally urged upwardly from prone relation to the upper surface of the base, said base having above and spaced from said surface a bearing, a detent-lever extending under the bearing and movable lengthwise of itself to and from a position in which one end thereof will overlie the lever when the latter is in prone relation to said surface, said detent-lever having under the bearing a substantially straight upwardly facing guideway extending lengthwise thereof and arranged to engage the bearing when said detent-lever is in said position and its other end is supported by bait resting on said surface and said detent-lever also having a stop adjoining the end of the guideway remote from and facing the lever and a depression at the end of the guideway adjoining said lever.

JAMES TURPAN.